US012701391B2

(12) United States Patent
    Wang

(10) Patent No.: US 12,701,391 B2
(45) Date of Patent: Aug. 4, 2026

(54) METHOD OF AND A NODE DEVICE FOR TRANSMITTING A TRIGGER MESSAGE IN A NETWORK OF OPERATIVELY INTERCONNECTED NODE DEVICES

(71) Applicant: SIGNIFY HOLDING B.V., Eindhoven (NL)

(72) Inventor: Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 531 days.

(21) Appl. No.: 18/024,438

(22) PCT Filed: Sep. 7, 2021

(86) PCT No.: PCT/EP2021/074538
§ 371 (c)(1),
(2) Date: Mar. 2, 2023

(87) PCT Pub. No.: WO2022/049300
PCT Pub. Date: Mar. 10, 2022

(65) Prior Publication Data
US 2023/0247403 A1      Aug. 3, 2023

(30) Foreign Application Priority Data

Sep. 7, 2020 (WO) ................ PCT/CN2020/113813
Dec. 24, 2020 (EP) .................................... 20217246

(51) Int. Cl.
*H04W 4/70* (2018.01)
*H04W 4/06* (2009.01)

(52) U.S. Cl.
CPC .............. *H04W 4/70* (2018.02); *H04W 4/06* (2013.01)

(58) Field of Classification Search
CPC ........... H04W 4/70; H04W 4/06; H04W 4/44; H04W 4/029; H04W 4/38; H04L 67/12; G16Y 10/35; G16Y 20/10; G16Y 40/35
See application file for complete search history.

(56) References Cited

U.S. PATENT DOCUMENTS

| 2012/0206051 A1 | 8/2012 | Nieuwlands |
| 2012/0217880 A1 | 8/2012 | Nieuwlands et al. |

(Continued)

FOREIGN PATENT DOCUMENTS

| CN | 102056374 A | 5/2011 |
| FR | 3087797 A1 | 5/2020 |

(Continued)

*Primary Examiner* — Andrew W Chriss

(57) ABSTRACT

A method of, a node device and a computer program product arranged for transmitting a trigger message in a network of operatively interconnected node devices arranged along at least one elongated track is disclosed. The trigger message is configured for triggering a service provided by the node devices to a moving object. The node devices are divided into a plurality of groups, each group comprising, seen in a moving direction of the object, a first edge node device, at least one normal node device and a second edge node device, within each group at least the first edge node device and the second edge node device respectively comprising a sensor for detecting the object. The method comprises the step of: receiving, by a first edge node device in a group, a first object-approaching trigger message transmitted by a second edge node device in an immediate preceding group; and transmitting, by the first edge node device in the group, a second object-approaching trigger message to other node devices in the group. The method therefore ensures that only forward group trigger of the service is performed.

19 Claims, 6 Drawing Sheets

(56) References Cited

U.S. PATENT DOCUMENTS

| | | | | |
|---|---|---|---|---|
| 2014/0139116 A1* | 5/2014 | Reed | H05B 47/11 | |
| | | | 315/153 | |
| 2015/0106508 A1 | 4/2015 | Knibbe et al. | | |
| 2016/0007429 A1 | 1/2016 | Eskonen et al. | | |
| 2016/0198548 A1 | 7/2016 | Monaci et al. | | |
| 2018/0288855 A1* | 10/2018 | Schröder | H05B 47/199 | |
| 2021/0314867 A1* | 10/2021 | Abou-Rizk | H04W 52/0222 | |
| 2021/0341508 A1* | 11/2021 | George | G01J 5/0025 | |

FOREIGN PATENT DOCUMENTS

| WO | 2009003279 A1 | 1/2009 |
|---|---|---|
| WO | 2011028145 A1 | 3/2011 |
| WO | 2012140610 A1 | 10/2012 |
| WO | 2014108786 A1 | 7/2014 |
| WO | 2016013939 A1 | 1/2016 |
| WO | 2017134091 A1 | 8/2017 |

* cited by examiner

METHOD OF AND A NODE DEVICE FOR TRANSMITTING A TRIGGER MESSAGE IN A NETWORK OF OPERATIVELY INTERCONNECTED NODE DEVICES

CROSS-REFERENCE TO PRIOR APPLICATIONS

This application is the U.S. National Phase application under 35 U.S.C. § 371 of International Application No. PCT/EP2021/074538, filed on Sep. 7, 2021, which claims the benefit of European Patent Application No. 20217246.6, filed on Dec. 24, 2020 and International Patent Application No. PCT/CN2020/113813, filed on Sep. 7, 2020. These applications are hereby incorporated by reference herein.

TECHNICAL FIELD

The present disclosure generally relates to the field of communication in a network of interconnected node devices or terminal devices and, more specifically, to a method of and a node device for transmitting a trigger message in a network of operatively interconnected node devices.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of such interconnected devices. These devices, generally called node devices or terminal devices, may comprise movable or mobile devices, operating with a wireless network connection, and/or stationary devices, having either or both a wired and/or wireless network connection.

US2018288855A1 discloses an outdoor lighting system. Luminaires are divided into groups. For each group, there is a group controller with both long range and short range communication interfaces. Other nodes are using short range communication interfaces. Some nodes may include sensors which provide signals indicative of changes in the environment allowing the network to adapt its operation in accordance with those changes. It gives an example of motion sensor detection and the detection result is passed from one group to the other via two group controllers or two normal nodes.

WO2012140610A1 discloses a system and a method for routing a data packet in a wireless network, wherein overlay routing is performed between junction groups comprising at least one node using a position-based routing protocol and underlay routing is performed between nodes of the network using link-based routing, for routing a data packet in a wireless network in a reliable, yet simple way, thus improving network scalability and communication efficiency.

In the case of a networked lighting system comprising a large number of node devices operating as lighting fixtures, some or even all node devices may be provided with sensors dedicated to or suitable for detecting the presence of a target or an object such as a pedestrian or a vehicle moving along a track, such as a street or a path having the lighting fixtures installed there-along. The inter-node device communication then may be used to alert node devices in the vicinity of the presence of the object such that these node devices may get prepared for providing service to the object, one of which being a light on demand service. Presently available smart street lighting systems, for example, typically provides such light on demand service.

Light delivered by a smart street lighting system under light on demand service is usually controlled based the above described motion detection and the so-called forward trigger. With motion detection, a node device, such as a luminaire, of the lighting system uses its sensor means to detect the motion of objects on the road or street and dims up or dims down its light level accordingly.

For the purpose of ensuring safety and enhancing comfort, the light on demand service requires not only the luminaire which detects the motion to dim up, but also neighbouring luminaires along the moving direction of the object to dim up in advance, that is, before motion sensors of the neighbouring luminaires actually detect the presence of the object. This is the so-called forward trigger or coherent/predictive reaction. To support forward trigger, a communication mean of the luminaire is arranged to inform (and be informed by) its neighbouring luminaires once it detects a motion.

For example, a typical light effect provided by a light-on-demand enabled lighting system may have three luminaires along a driving direction of a car dimmed up to 100% in advance to ensure driving safety. As another example, two luminaires along a walking direction of a person may be dimmed up to 80% in advance for safety and comfort considerations.

The precise realisation of the above described desired light effect normally requires advanced sensor as well as huge commissioning efforts. Specifically, to ensure forward trigger, the sensor of a luminaire has to detect the moving direction of the object, in addition to the motion of the object. This is not possible for the widely used low-cost PIR and microwave/radar sensors. On the other hand, during commissioning of the luminaires, an installer has to create for each luminaire a table of neighbours with both direction and sequence info, e.g., first/second/third luminaire on the left side, first/second/third luminaire on the right side.

As an example, an available solution proposes a method of building up a table of neighbours by each luminaire via self-learning. For this purpose, each luminaire is equipped with or connected to an optical sensor such as a camera with a wide viewing angle for detecting motion as well as moving directions and positions of the moving objects. The learning by each luminaire is based on a correlation of a received forward-trigger message and an optical detection of a neighbouring luminaire dimming up. Such a solution is costly to implement as the optical sensor introduces extra cost for each luminaire.

Another existing solution called SmartBright Road uses a low-cost microwave senor and a RF communication module to realize low-cost smart street lighting solution. According to this solution, a luminaire detects only the motion of the moving object and transmits a broadcast message upon a motion is detected. This largely reduces the cost of the luminaires, the complexity of communication stack implementation and the effort of commissioning required to create a table of neighbours. However, this solution cannot realise true and well-controlled forward trigger as the broadcast message can reach an uncertain number of neighbouring luminaires in both directions.

Still another solution proposes to use sensors for detecting both motion and the moving direction, and to add extra means into the luminaire to know its location. This allows the moving direction of the object and a location of a luminaire detecting the object to be added into a broadcast message transmitted by the luminaire. On receiving a broadcast message, a neighbouring luminaire determines its response based on information in the message, that is, whether to dim up and relay the message or not. This solution increases both the cost of luminaire and complexity of communication stack implementation.

It is seen from the above that the currently available solutions are expensive and complicated and therefore hinder the wide adoption of smart street lighting solutions.

Accordingly, there is a genuine need for an improved solution of forward trigger for a network of operatively interconnected node devices, such as low cost trade channel luminaires, without incurring extra cost and little or no increase of commissioning effort.

SUMMARY

In a first aspect of the present disclosure, there is presented a method of transmitting a trigger message in a network of operatively interconnected node devices arranged along at least one elongated geographic track, the trigger message configured for triggering a service provided by the node devices to an object moving along the geographic track, the node devices divided into a plurality of groups, each group comprising, seen in a moving direction of the object, a first edge node device, at least one normal node device and a second edge node device, within each group at least the first edge node device and the second edge node device respectively comprising a sensor for detecting the object, the method comprising the step of:

receiving, by a first edge node device in a group, a first object-approaching trigger message, the first object-approaching trigger message is a dedicated message destined to the first edge node device in the group from the second edge node device in the immediate preceding group; and transmitting, by the first edge node device in the group, a second object-approaching trigger message to other node devices in the group.

The present disclosure is based on the insight that forward trigger of a service provided by a network of interconnected node devices may be realised on the basis of group level forward triggering, i.e. a group triggers an immediate subsequent group. This can be achieved in a plurality ways, e.g. with a first node device of a present group of node devices getting triggered by a last node device of an immediate preceding group (e.g. by a dedicated message from the last node device of an immediate preceding group only to a first node of the group) and then further triggering other node devices in the same group to provide the service. A trigger message from the last node device of the immediate preceding group indicates that an object was detected by a node device in the immediate preceding group and is approaching the present group comprising the first edge node device, and therefore the node devices in the present group, which are next in the moving direction of the object, should prepare and trigger the service for the arrival of the moving object.

The node devices in the network are divided into a plurality of groups, for example, by an installer during a commissioning stage of the network of node devices. Node devices located at edges of the group, that is, node devices that detect the arrival of the moving object at the earliest and the latest point of time, by their respective sensors, are identified as a first edge node device and a second edge node device of the group respectively. Node devices between the first edge node and the second edge node or other than the first edge node and the second edge node are identified as normal node devices.

It can be contemplated by those skilled in the art that during operation first edge nodes and second edge nodes can be dynamically exchanged with different travel directions of moving objects, especially for a lighting service on roads having lighting devices at one side which illuminate two traffic directions. As for streets with lighting devices at two sides, lighting devices on one side may always illuminate one traffic direction, as a result the first and second edge node devices are fixed.

In the case that only edge node devices comprise sensors for detecting moving objects, the identification of the edge node devices may be preconfigured or commissioned during the commissioning stage of the network. On the other hand, the identification of the edge node devices may be done by the node devices themselves via a learning process, in the case that at least one normal node devices or all normal node devices also comprise sensors for detecting moving objects, which will be described in detail later.

The grouping and identification of edge node devices allows a second edge node device located in a group, herein referred to as the immediate preceding group, which becomes aware of the presence of an object moving towards a next group in the moving direction of the object, to transmit a first object-approaching trigger message to an immediate neighboring node device, which is the first edge node device of the next group, herein referred to as the (present) group.

For the purpose of realizing forward triggering of the service, the first object-approaching trigger message is transmitted along a travel direction of the object, that is, from the second edge node device of the immediate preceding group to its neighbouring node device, which the first edge node device in the present group The first edge node device of the present group, upon receiving the first object-approaching trigger message, gets triggered and starts to provide the service, in preparation for the arrival of the moving object. Moreover, the first edge node device of the present group further transmits a second object-approaching trigger message to other node devices in the same present group, thereby allowing the other node devices in the same present group to get the service ready before the arrival of the moving object.

As a result, the second node device of the immediate preceding group will trigger only the neighboring or next group in the moving direction of the moving object. By adjusting the number of groups to be triggered along the moving direction of the object, the number of node devices being triggered can be well controlled.

The terms "the immediate preceding group" and "the present group" are selected only for the purpose of clearly describing the concept of the present disclosure without limiting the scope of protection of the claims. It can be understood that other terms may be used, such as a first group and a second group, a group and an immediate subsequent/successive group, depending on describing the method from the perspective of various edge node devices in the network.

Based on the solution of the method of the present disclosure, the node devices in the network are not required to detect the moving direction and/or position of the moving object. The node devices, in particular the edge node devices, can therefore be equipped with simple motion detector sensors, without the need of upgrading hardware, which helps to keep the cost of the whole network low.

Moreover, the commissioning of the network remains simple and essentially the same as the current available solution in terms of grouping of the node devices.

In an embodiment of the present disclosure, the first object-approaching trigger message is a unicast message, the second object-approaching trigger message is a broadcast message. Alternatively, the first object-approaching trigger message can be a groupcast or multicast message by a second edge node in a first group dedicated to an immediate subsequent group of the first group. To increase the reliability, the first edge node in the immediate subsequent group can further send out a second object-approaching trigger message to other node devices in the immediate subsequent group in response to the groupcasted or multicasted first object-approaching trigger message.

Various method may be used to ensure that the first object-approaching message is destined and received by the first edge node device in the group. As an example, a unique address of a destination, which is the first edge node device in the present group, of the first object-approaching trigger message may be identified in the first object-approaching trigger message. It ensures that the first object-approaching trigger message from the second edge node device of the immediate preceding group is solely received by the first edge node device in the present group. In the case of a ZigBee network, the first object-approaching trigger message is a unicast message.

As for the second object-approaching trigger message, it can be a broadcast message from the first edge node device in the present group to all other node devices in the same group.

In an embodiment of the present disclosure, the first object-approaching trigger message is transmitted by the second edge node device in the immediate preceding group, in response to receiving an object-detected trigger message at least from a first edge node device, in the immediate preceding group, detecting the object by its sensor.

It can be easily understood by those skilled in the art that the forward trigger is a continuous process happening to node devices along the moving direction of the object. Therefore, the second edge node device of the immediate preceding group, was at a previous moment, triggered by an other node device, in the immediate preceding group, which detected the moving object using its sensor.

This other node device may be the first edge node device of the immediate preceding group, which also comprises a sensor for detecting the moving object. Upon detecting the moving object, the first edge node device of the immediate preceding group transmits an object-detected trigger message, such as a broadcast message, to other node devices in the same group.

Normal node devices with sensors, of the immediate preceding group, will only activate the service to be provided to the moving object upon receiving the broadcast message, and optionally relay the broadcast message if required, depending for example on a size of the groups.

The second edge node device of the immediate preceding group may receive, the object-detected trigger message directly from the first edge node device of the immediate preceding group. Alternatively, the object-detected trigger message transmitted by the first edge node device of the immediate preceding group may be relayed to the second edge node device of the immediate preceding group by normal node devices located in between the first and second edge node devices in the immediate preceding group.

The second edge node device of the immediate preceding group, which has not detected the object using its sensor, when receiving this object-detected trigger message, knows or recognises that the moving object is approaching itself and also a next neighbouring group. It therefore transmits the first object-approaching trigger message, to the first edge node devices of the present group, to forward trigger the node devices in the present group.

In an embodiment of the present disclosure, within each group at least one normal node device comprises a sensor for detecting the object, the first object-approaching trigger message is transmitted by the second edge node device in the immediate preceding group, in response to further receiving an object-detected trigger message from at least one normal node device comprising a sensor, in the immediate preceding group, detecting the object by its sensor.

The transmission of the first object-approaching trigger message by the second edge node device in the immediate preceding group depends on the second edge node recognizing or identifying itself as a second edge node or the last node device within the immediate preceding group, along the moving direction of the object. It may be sufficient for the edge node device of a group to recognize that it is the last node of the immediate preceding group along the moving direction of the object, by receiving an object-detected trigger message from another node device in the same group but not detecting the object using its own sensor.

More accurate control of the transmission of the first object-approaching trigger message may be realised by having at least one normal node device comprising a sensor as well. This allows the second edge node device in the immediate preceding group to receive, for example within a very short period such as a few seconds, at least two consecutive motion detection messages, or object-detected trigger message as herein referred to. A first motion detection message is sent from the first edge node of its own group, a second and optionally other motion detection messages are sent from the at least one normal node device of its own group which has a sensor. At the moment of receiving the second or a later motion detection message from a normal node device of its own group, the second edge node knows that the object is approaching therefore it should transmit the first object-approaching trigger message to its neighbouring edge node in the next group, i.e., to forward trigger the next group.

Providing or equipping more node devices in the network with sensors such as a readily available low cost motion sensor does not increase the cost of the network much, while the accuracy of forward trigger can be improved significantly.

Based on the description up till now, the operation of the method in accordance with the present disclosure may be summarised as follows in the most general form: Upon detecting a moving object by a first edge node device in a group using its sensor, the first edge node device transmits a broadcast motion detection message to other node devices in this same group, to inform the other node device to prepare and provide the service before the arrival of the object. The broadcast message may be relayed between the other node devices in the group, until it arrives at a second edge node device of the same group, which is the last node device in the group along the moving direction of the object. A normal node device, equipped with a sensor, in the same group, upon detecting the moving object, may also transmit a broadcast motion detection message to the other node devices in the same group. The second edge node device, upon receiving the at least one broadcast message, transmitted by the first edge node device in the same group and optionally by normal node devices in the same group, and recognizing that it is the last node device of the same group, transmits for example a unicast message, that is, a first object-approaching trigger message, to its neighbouring node device, which is a first edge node device in a next group along the moving direction of the object. The first edge group in this next group is therefore aware of the approaching of the moving object, which will in turn transmit an object-approaching message, which may be also a broadcast message, to other node devices in this next group, such that the other node devices will get ready to provide the service to the moving object. Node devices in each group operate in a similar way so as to forward trigger node devices, group by group, in a reliable way.

In an embodiment of the present disclosure, the method further comprises the step of:

transmitting, by the first edge node device in the group, an object-detected trigger message only to node devices in the group, in response to detecting the object by its sensor, the object-detected trigger message configured for triggering a second edge node device in the group to further transmit a further first object-approaching trigger message to a first edge node device in an immediate subsequent group.

It can be easily understood that the moving object will at a certain time move to the present group of node devices, and get detected by the first edge node device of the present group, using its sensor. The first edge node device of the group will now transmit an object-detected trigger message to other node devices in the same group. However, the object-detected trigger message will not be transmitted to the second edge node device of the immediate preceding group. Therefore, the first edge node device in the group will not reverse trigger the node devices in the immediate preceding group. Precise forward triggering at group level is therefore realised.

The object-detected trigger message, which is also a broadcast message, transmitted by the first edge node device of the present group, when received directly or via relay by the second edge node device of the present group, will be used to trigger a first edge node device of the next neighbouring group, herein referred to as the immediate subsequent group.

The group based forward triggering is therefore controlled precisely, ensuring that the node devices in a group detecting the moving object will trigger node devices only in the next group along the moving direction of the object, while not reverse triggering a previous group of node devices that the object has already passed.

The transmission logic as described is easy to implement and requires no extra hardware update and only a little bit more commissioning effort for grouping the node devices. It is therefore especially advantageous for node devices provided with simple motion detecting sensors which are available off-shelf.

In an embodiment of the present disclosure, the first object-approaching trigger message comprises an indicator indicating a number of groups to be sequentially triggered by relaying a first object-approaching trigger message from a second edge node device in a group to a first edge node device in an immediate subsequent group.

It is described that a motion being detected by a first group of node devices may trigger a second group of node devices by way of the transmission of a first object-approaching trigger message to. It can be contemplated that more groups such as a third or even a fourth group of node devices may also be accordingly triggered. This may be controlled by a setting an indicator similar to a number of hop, in the first object-approaching trigger messages. This can be easily realised by adding a parameter in the unicast forward trigger message. As a result, better control of the forward trigger is realised, with little added cost in terms of communication.

In an embodiment of the present disclosure, the trigger messages are configured to trigger the service for a determined period of time, a period of time of the service triggered by the first and second object-approaching trigger messages is longer than a period of time of the service triggered by the object-detected trigger message.

It is seen from the above description that the first or second object-approaching trigger message is transmitted from a last node of a group to a first node of a next group or among node devices in a group which has not detected the moving object yet, while the object-detected trigger message is transmitted in a group comprising a node device which has already detected the moving object. Therefore, it is logical that the service triggered by the first and second object-approaching trigger messages is activated for a longer time, so as to allow the moving object more time to travel to the group of node devices triggered by the object-approaching trigger message. This allows safe and better user experience in terms of the service provided by the node devices.

In an embodiment of the present disclosure, within each group at least one of the at least one normal node device also comprises a sensor for detecting the object, the method further comprising an initiating step of a node device identifying itself as an edge node device, the initiating step comprising the steps of:

generating, by the node device, an event log comprising a plurality of items for node devices in a group comprising the node device, each item comprising a unique identifier of a respective node device comprising a sensor in the group and a time of detecting the object by a sensor of the respective node device; and identifying, by the node device, itself as an edge node device when an item comprising its unique identifier comprises an earliest or latest time of detecting the object by a sensor of the node device.

When one or more normal node devices, in addition to the edge node devices, also comprise sensors for detecting a moving object, this identification procedure may be performed by the grouped node devices in a learning period, which takes place after the commissioning of the node devices. Each node device within a group records, for node devices in its group, a time when the moving object is detected by a node device with a sensor in its group together with an identifier such as a network address of the node device detecting the object with its sensor. The node device can then determine whether it is located at an edge of the group, that is, it is the first or last node device of the group detecting the moving object.

The self-learning process may be implemented in a straightforward manner using standard communication protocols and requires little data processing capacity. The identification of the node devices is therefore realised without incurring extra commissioning effort for creating tables of neighbouring nodes.

In an embodiment of the present disclosure, each item of the event log further comprises a speed of the moving object, speeds of all items for the respective node devices in the group are substantially equal to each other.

This is for facilitating the learning process and ensuring that the node device can correctly identify itself using the learning process. The node devices in each group can easily keep items comprising essentially equal speeds while discarding other data that are not consistent with each other.

In an embodiment of the present disclosure, the method further comprises a step of identifying, by a particular edge node device in a group, an edge node device as its closest edge node device in a neighbouring group by way of the following steps:

receiving, by the particular edge node device, a number of one hop broadcast messages transmitted by edge node devices in neighbouring groups;

creating, by the particular edge node device, a neighbouring edge node table comprising a plurality of items, each item comprising a unique identifier of an edge node device transmitting a one hop broadcast message, a group identifier of the edge node device, and a signal strength indicator of the one hop broadcast message; and identifying, by the particular edge node device, an edge node device in a neighbouring group transmitting most received one hop broadcast messages with highest signal strength indicator as its closes edge node device in a neighbouring group.

This procedure may be considered as a second stage of the learning process, which allows each edge node device of a group to identify a closest neighbouring edge node device located in a neighbouring group. The group triggering of the service in accordance with the present disclosure is made possible by this identification procedure.

The above steps involve only exchange of messages according to standard communication protocols and straightforward storage and comparison operation. Each edge node device thereby identifies its closest neighbouring node device in a neighbouring group, which allows a second edge node device in a group to trigger a first edge node device in a next group.

In an embodiment of the present disclosure, the method further comprising the steps of:

transmitting, by the particular edge node device, a unicast message to the edge node device identified as the closest edge node device in the neighbouring group; and receiving, by the particular edge node device, a response unicast message as a confirmation from the edge node device identified as the closest edge node device in the neighbouring group.

This is used to further confirm that the closest neighbouring node device identified using the above steps is a correct and valid one. The operation of exchanging a handshake message is easy to implement and takes little communication resources.

In an embodiment of the present disclosure, edge node devices are preconfigured during commissioning of the network of operatively interconnected node devices.

This is particularly in consideration of a low cost network in which only edge node devices are provided with sensors. The cost of the network is reduced at the expense of a bit more commissioning effort.

In an embodiment of the present disclosure, the node devices comprise at least one of smart pole devices and lighting devices, providing at least one of a lighting service, a network access service and a geographic routing service to the moving object.

Based on the idea of a "smart city", light poles can be "smart" poles comprising various devices, including not only conventional lighting fixtures but also other devices such as access points, a router for example, for data communication or a device for providing geographic routing information to an object moving past a smart pole, which is a convenient and efficient application or use of such a smart pole.

On the other hands, a lighting device in itself, in addition to a luminaire for providing lighting service, may be integrated with other devices providing other services, such as network access function provided by a subscriber identity module, SIM, card or a ZigBee interface, to a passing-by object such as a pedestrian or a vehicle.

As a specific example, the service may be light on demand service. As an example, the lighting profile or pattern may be designed allowing a lighting device closer to the object to be dimmed up to a higher luminance level than more distanced lighting devices. This helps to ensure the best use experience while operating the lighting device in an energy efficient manner.

In a second aspect of the present disclosure, there is presented a node device for transmitting a trigger message in a network of operatively interconnected node devices, according to the method of the first aspect of the present disclosure.

In particular, the node device comprises at least one of a smart pole device and a lighting device comprising at least one luminaire.

The node device operates according to the method of the present disclosure, for realising precise forward trigger of service in a network of interconnected node devices, without incurring extra hardware upgrade cost or more commissioning effort. The method may be applied to the node device as a firmware upgrade, for example, in the factory or via over the air update for already sold/installed devices.

In a third aspect of the present disclosure, a computer program product is provided, comprising a computer readable storage medium storing instructions which, when executed on at least one processor, cause the at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to a network of operatively interconnected lighting devices functioning as node devices of the network. Those skilled in the art will appreciate that the present disclosure is not limited to a network of lighting devices, but is applicable for networks of a wide variety of node devices enabled with network communication connectivity.

The terms "node device", "node", "lighting device", "lighting fixture", "luminaire" are used interchangeably in the following description.

The phrase "detecting a moving object by a node device using its sensor" is used interchangeably with the phrase "detecting a moving object by a node device".

Figure 1:
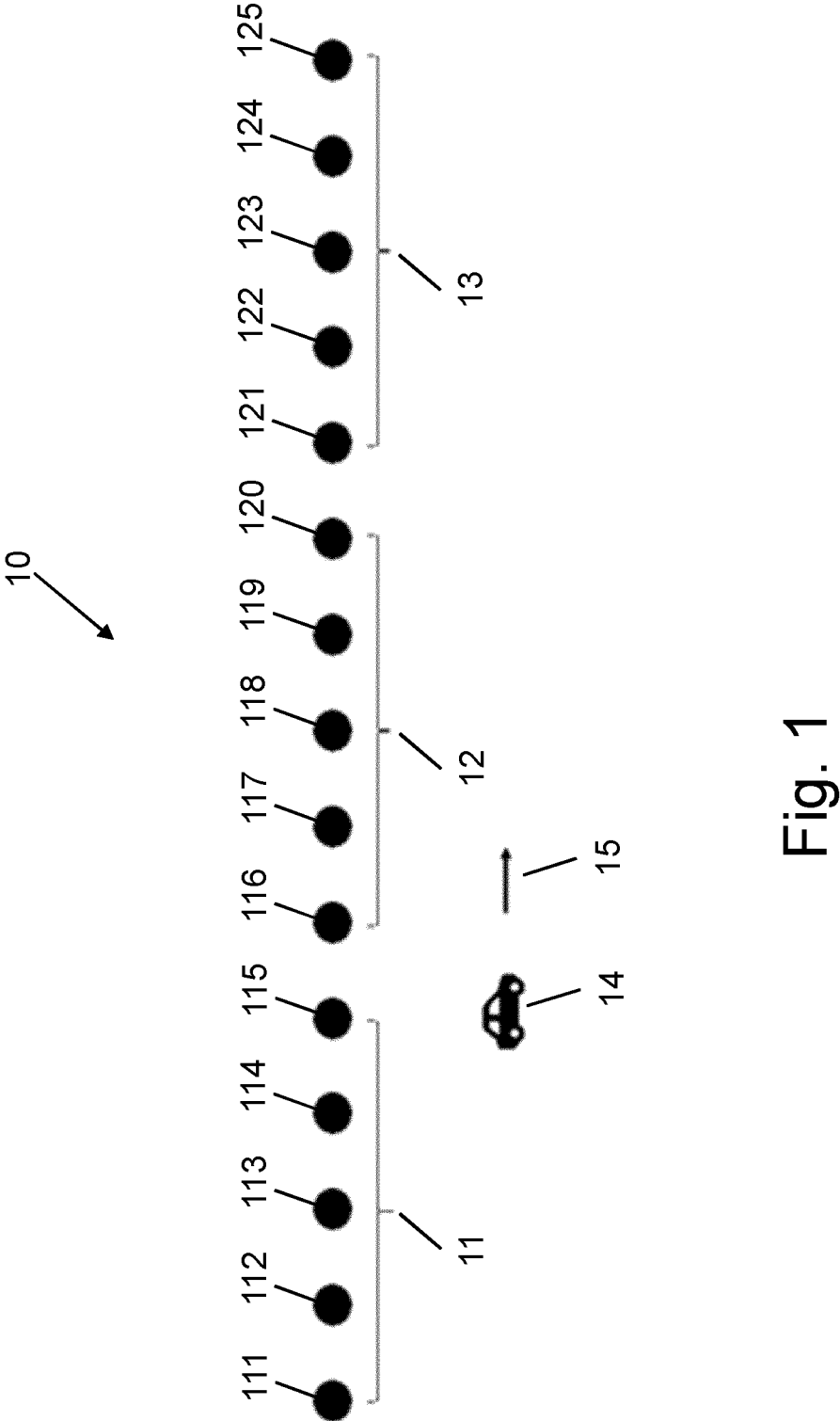
FIG. 1 schematically illustrates a network of lighting devices arranged along an elongated track, in accordance with the present disclosure.

FIG. 1 schematically illustrates a network 10 of lighting devices 111 to 125 arranged along an elongated track (not shown) such as a street, a highway or a road, in accordance with the present disclosure. The lighting devices may also be arranged along winding roads or more complicated road layouts.

During a commissioning procedure for the lighting devices, an installer may create a plurality of groups and assigned the lighting devices into the respective groups. In the example as illustrated in FIG. 1, three groups indicated by numerals 11, 12 and 13 are created, with each group respectively comprising five lighting devices 111 to 115, 116 to 120, and 121 to 125. Although only three groups and fifteen lighting devices are shown, it can be contemplated that any number of node devices and groups maybe involved.

Node devices in each group may be classified into edge node devices located or positioned at both ends or edges of the group and normal node devices located in between the edge node devices. It goes without saying that each group comprises two edge node devices and a number of normal node devices. Taking the group 11 of FIG. 1 as an example, it comprises two edge node devices 111 and 115 and three normal node devices 112, 113 and 114.

In practice, a group comprises at least three node devices, that is, two edge node devices plus one normal node device. This allows the edge nodes to determine a moving direction (i.e., approaching or leaving) of a moving objection, such that forward trigger may be realised. In principle, fewer nodes in each group helps to achieve better performance of the network in terms of energy saving and user experience, at the cost of more effort of commissioning, as more operation on creating groups is needed.

Each lighting device may be equipped or provided with a presence detection sensor for detecting the presence of a moving object 14 which travels along a moving or travel direction indicated by an arrow 15, along the track having the lighting devices arranged there-along. On the other hand, it is possible to provide or equip only the edge node devices with sensors, which will help to further reduce the cost of the network.

Depending on the moving or travel direction 15 of the object 14, an edge node device of a group that detects the object 14 at an earliest time point may be referred to as a first or starting edge node device, while an edge node device of the group that detects the object 14 at a latest time point may be referred to as a second, last or end edge node device. In other words, seen in the direction of movement of the object, each group comprises a first edge node device, at least one normal node device and a second node device.

Taking the group 11 of FIG. 1 as an example, for the object 14 traveling along the direction 15, the node device 111 is considered as the first or start edge node device of the group 11, and the node device 115 is considered as the second or end edge node device of the group 11. It can be easily understood the roles of the node devices 111 and 115 will be switched for a vehicle travelling in a direction opposite to the direction 15.

Except for the first and last group, both edge node devices of a group have a closest edge node device in a neighbouring group. As an example, for a node device 116 of the group 12, which may be considered as a first edge node device of the group 12 with reference to the object 14 moving along the direction 15, its closest (neighbouring) edge node device in a neighbouring group 11 is the node device 115, while a node device 120 of the group 12 has a node device 121 of a neighbouring group 13 as its closest or neighbouring edge node device.

In the case that only edge node devices comprise sensors, during installation it is ensured that edge node devices are installed at proper locations. Thereafter, during the commissioning of the network, identifications of the edge node devices are preconfigured or stored in the nodes, and optionally at a central system, allowing the edge node devices to be identified easily during operation.

Alternatively, when both the edge node devices and at least one normal node device in all groups of the network are provided or equipped with sensors, after commissioning of the node devices, node devices in a group may take or use a learning process to identify its location in the group, that is, to identify whether it is an edge node device or a normal node device. Moreover, an edge node device may also use the learning process to identify its closest edge node device.

A pragmatic scenario will be equipping or providing all node devices with sensors, such as simple lost cost motions sensors, this will allow minimum installation effort and little commissioning effort, for example only for grouping the node devices. Then node devices may then use a learning process to identify the edge node devices and a closest edge node device for each edge node, which is described in the following with reference to FIGS. 2 and 3.

Figure 2:
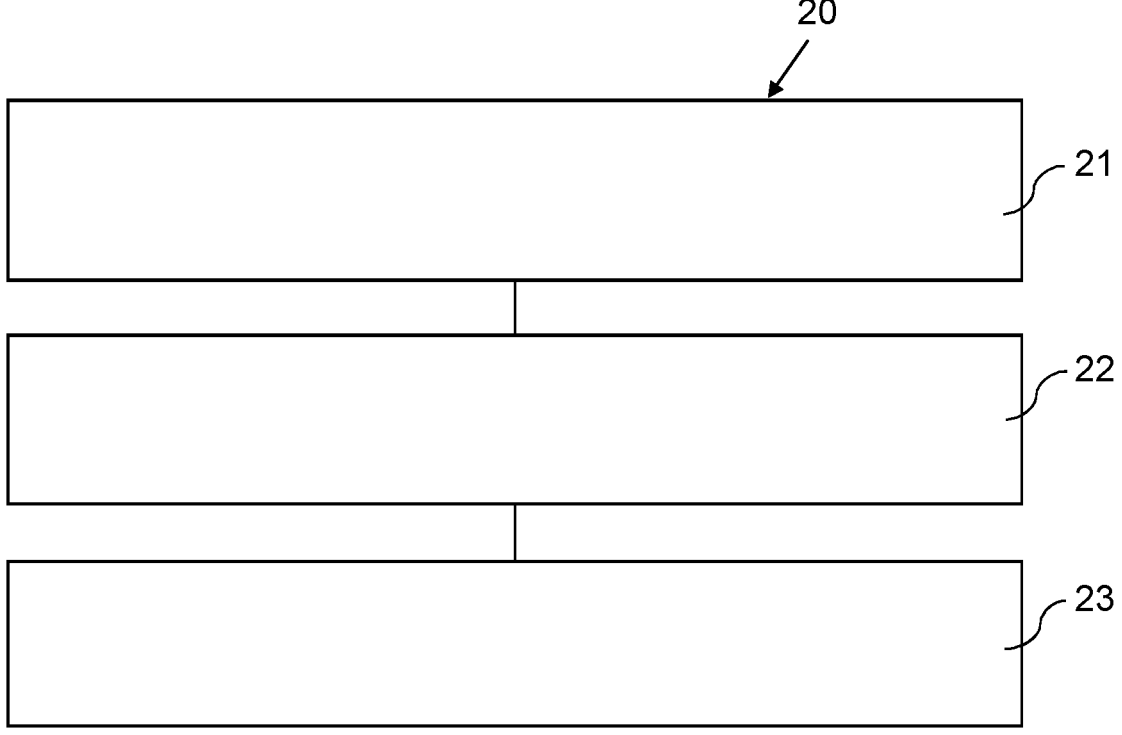
FIG. 2 schematically illustrates, in a flow chart type diagram, an embodiment of a method of identifying edge node devices and normal node devices according to the present disclosure.

FIG. 2 schematically illustrates, in a flow chart type diagram, an embodiment of a method 20 of identifying edge node devices and normal node devices according to the present disclosure.

The method 20 is implemented as a learning process performed by each node device and may take place or happen when there is less traffic, for example, late at night.

When the method 20 starts, at step 21, "Generating an event log comprising items for node devices in a group, each item comprising an ID of a node device and a time of detecting object by the node device", an event log is compiled or generated based on information on detecting a car by each node device in a group.

The step 21 is describes in detail with reference to the lighting devices or luminaires 116 to 120 of the group 12 of FIG. 1. Specifically, when a luminaire, such as the luminaire 116, detects a moving object, such as car driving at a speed in a pre-defined range (e.g., 20-40 km/h), the luminaire 116 adds one item in the event log, which may be kept locally in an internal storage device of the luminaire 116 or stored centrally in a remote device such as a remote server.

The item added to the event log comprises an event ID, which may be a sequence or serial number, an unique address of a luminaire detecting the moving object, such as a network address of the luminaire, a time when the moving object is detected, and a speed of the detected moving object.

In the meantime, the luminaire 116 sends out a broadcast message to luminaires within its own group 12, with the message comprising the speed of the detected car. A number of hops of the broadcast message is set at a proper value to ensure that the broadcast message will cover all the luminaires in the same group 12.

Other luminaires 117 to 120 in the group 12, upon receiving the broadcast message transmitted by the luminaire 116, also adds an item in its event log. As the car is detected by the luminaire 116, a time of detection recorded by the other luminaires 117 to 120 is based on a time when the broadcast message transmitted by the luminaire 116 is received by each of the other luminaires 117 to 120. That is, a delay caused by communication is ignored.

Note that the sensors in the luminaires can easily extract the speed info (in a step of 5 km/h for example) from the sensor signal.

Table 1 is an exemplary event log generated by the luminaires of the group 12.

TABLE 1

| ID | Address | Time | Speed |
|-----|---------------------|----------|---------|
| 001 | 0x06 (luminaire 116) | 23:15:11 | 30 km/h |
| 002 | 0x07 (luminaire 117) | 23:15:13 | 30 km/h |
| 003 | 0x08 (luminaire 118) | 23:15:15 | 30 km/h |
| 004 | 0x09 (luminaire 119) | 23:15:17 | 30 km/h |
| 005 | 0x10 (luminaire 120) | 23:15:19 | 30 km/h |
| 006 | 0x10 | 23:23:20 | 20 km/h |
| 007 | 0x09 | 23:23:23 | 20 km/h |
| 008 | 0x08 | 23:23:26 | 20 km/h |
| 009 | 0x07 | 23:23:29 | 20 km/h |
| 010 | 0x06 | 23:23:32 | 20 km/h |

Refer to FIG. 1 and Table 1, it is assumed there is only one car driving from left to right in the direction 15 and passing luminaire 116 to 120 one by one in sequence with a constant speed of 30 km/h. Considering there is less traffic and the short distance between luminaires 116 and 120 (e.g., 80 meter), this can reflect a real life scenario well. Therefore, in the event log table of each luminaire, there will be 5 records as the first 5 items (event ID 001 to 005) of Table 1. It can be understood that there may be cars only passing part of luminaire 116 to 120 or passing them with varying speed, which will be removed from the event log or just ignored and not used for the learning.

If Table 1 is the event log maintained by the luminaire 116, item 001 represents detection of the moving object by the luminaire 116, the time 23:15:11 is when the sensor of the luminaire 116 actually detects the object. Items 002 to 005 represent detection of the moving object by the luminaires 117 to 120, in which the times are actually the times when the luminaire 116 receives broadcast messages respectively from the luminaires 117 to 120 indicating that the moving object is detected by each of luminaires 117 to 120 respectively.

Similarly, one car driving from right to left in a direction opposite to the direction 15 and passing luminaire 120 to 116 in sequence with a constant speed of 20 km/h will generate 5 records as the last 5 items (event ID 006 to 010) of Table 1.

When there are enough useful event records, at step 22, "Identifying a node device as edge node device when item comprising its ID comprises an earliest or latest time of detecting object", a luminaire will be able to determine or identify whether it is at an edge position of its group. For example, the luminaire 116 and 120 will know that they are the two edge nodes of group 12, as the items corresponding to the two luminaries respectively comprise an earliest and an latest time of detection.

Following that, at step 23, both luminaires 116 and 120 inform other luminaires of the group 12 that they are the edge node of the group 12. Once a luminaire knows the two edge nodes of its group, it will exit the first stage of the learning period.

A next stage of the learning procedure allows an edge node device to determine its closest edge node device in a neighbouring group.

Figure 3:
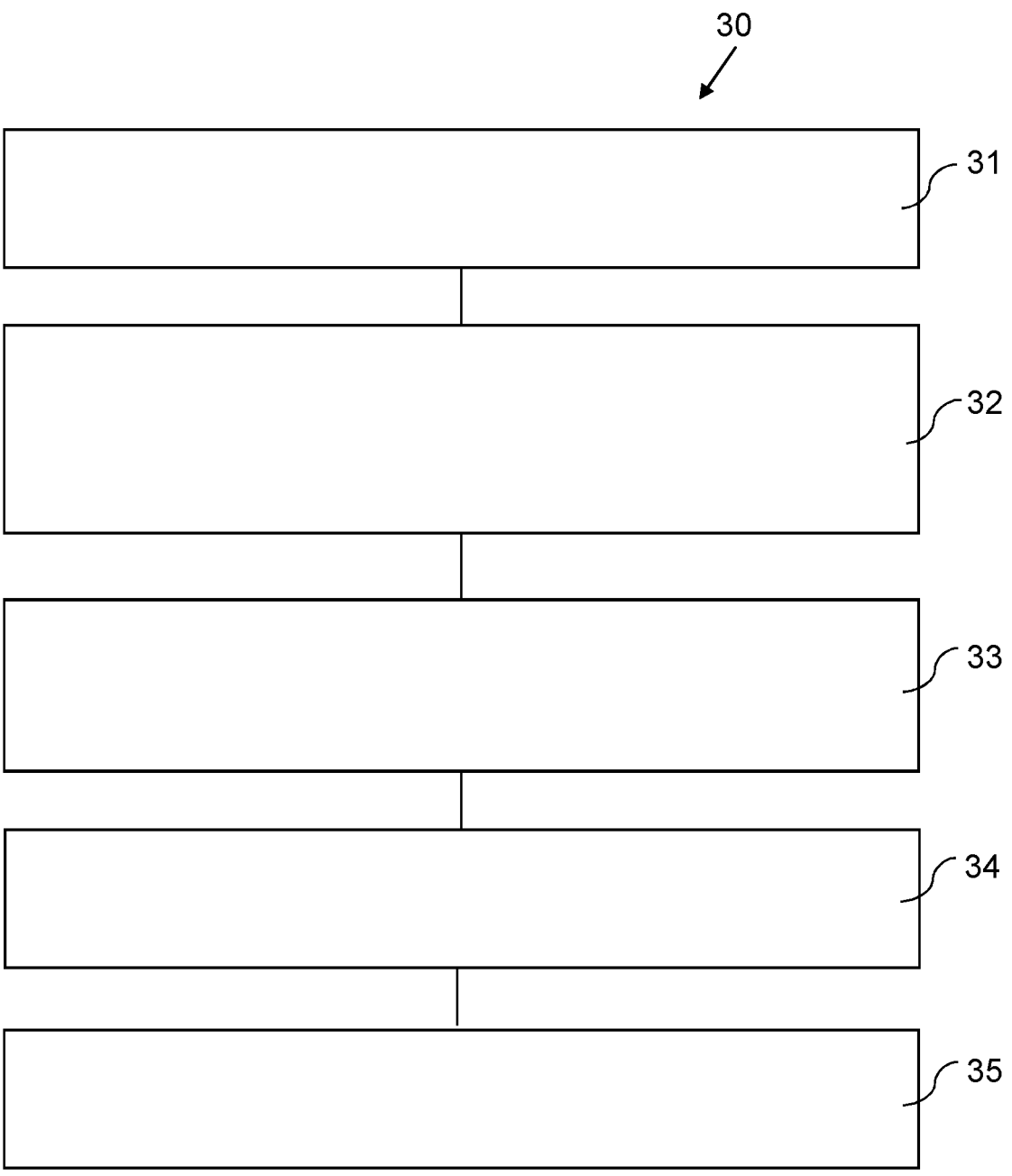
FIG. 3 schematically illustrates, in a flow chart type diagram, an embodiment of a method of identifying or determining a closest edge node device of an edge node devices according to the present disclosure.

FIG. 3 schematically illustrates, in a flow chart type diagram, an embodiment of a method 30 of identifying or determining a closest edge node device of an edge node devices according to the present disclosure. The method 30 is described with reference the luminaire 116 of the group 12 of FIG. 1.

At step 31, an edge node device, such as the luminaire 116 of the group 12, receives a number of 1-hop broadcast messages transmitted by edge node devices outside its own group 12. The 1-hop broadcast messages are transmitted with a fixed or random interval. Each 1-hop broadcast message comprises a message type ID, a group ID of an edge node device transmitting the 1-hop broadcast message, and a unique identifier of the edge node device transmitting the 1-hop broadcast message, such as its network address. The message type ID (e.g., 0x88) is used to indicate this message is sent from one edge node to other edge nodes, although a non-edge node may also receive this message.

At step 32, the edge node device creates a neighbouring edge node table comprising a plurality of items, each item comprising a unique identifier of an edge node device transmitting a 1-hop broadcast message, a group ID of the edge node device, and a signal strength indicator, such as an received signal strength indication, RSSI, of the 1-hop broadcast message.

Table 2 is an exemplary table of neighboring edge nodes of the luminaire 116. Most items in Table 2 are messages sent by the luminaire 115, only few messages are from luminaire 111 and 121 with a much smaller RSSI.

TABLE 2

| ID | Address | Group ID | RSSI |
|-----|----------------------|------------------|------|
| 001 | 0x05 (luminaire 115) | 0x01 (group 11) | −30 |
| 002 | 0x05 | 0x01 | −35 |
| 003 | 0x05 | 0x01 | −28 |
| 004 | 0x05 | 0x01 | −32 |
| 005 | 0x01 (luminaire 111) | 0x01 | −115 |
| 006 | 0x05 | 0x01 | −31 |
| 007 | 0x05 | 0x01 | −26 |
| 008 | 0x05 | 0x01 | −34 |
| 009 | 0x11 (luminaire 121) | 0x03 (group 13) | −118 |

At step 33, the luminaire 116 can easily identify that luminaire 115 is its closest edge node among neighboring groups, as the luminaire 115 transmits most 1-hop broadcast messages with the highest RSSI.

Optionally, at step 34, the luminaire 116 may send a unicast message to the identified closest edge node, that is, luminaire 115, as handshake message. After transmitting the handshake message, at step 35, the luminaire 116 receives a unicast message responded by the luminaire 115 as a confirmation. This confirms that the luminaire 115 is the closest edge node device of the luminaire 116.

Finally, luminaire 116 notifies other luminaires of group 12 that it has identified the closest edge node. Once a luminaire received the notifications from both edge nodes of its group, the second learning stage as well as the whole learning period are completed. The luminaire then enters normal operation.

The learning procedure classifies the luminaires into two types: normal nodes and edge nodes. Each edge node (except for the very first and very last luminaire along the road) has a neighboring edge node which is the closest edge node in its neighboring groups. Table 3 shows an exemplary classification of the 15 luminaires in FIG. 1, in which luminaire 111 and 125 are the very first and very last luminaires, respectively.

TABLE 3

| Luminaire No. | Type | Neighboring edge node |
|---|---|---|
| Luminaire 111 | Edge node | N/A |
| Luminaire 112 | Normal node | N/A |
| Luminaire 113 | Normal node | N/A |
| Luminaire 114 | Normal node | N/A |
| Luminaire 115 | Edge node | Luminaire 116 |
| Luminaire 116 | Edge node | Luminaire 115 |
| Luminaire 117 | Normal node | N/A |
| Luminaire 118 | Normal node | N/A |
| Luminaire 119 | Normal node | N/A |
| Luminaire 120 | Edge node | Luminaire 121 |
| Luminaire 121 | Edge node | Luminaire 120 |
| Luminaire 122 | Normal node | N/A |
| Luminaire 123 | Normal node | N/A |
| Luminaire 124 | Normal node | N/A |
| Luminaire 125 | Edge node | N/A |

Based on all the information collected or generated during the learning period, a system designer can realize desired forward trigger using standard operation by defining actions or operations respectively for edge nodes and normal nodes.

Figure 4:
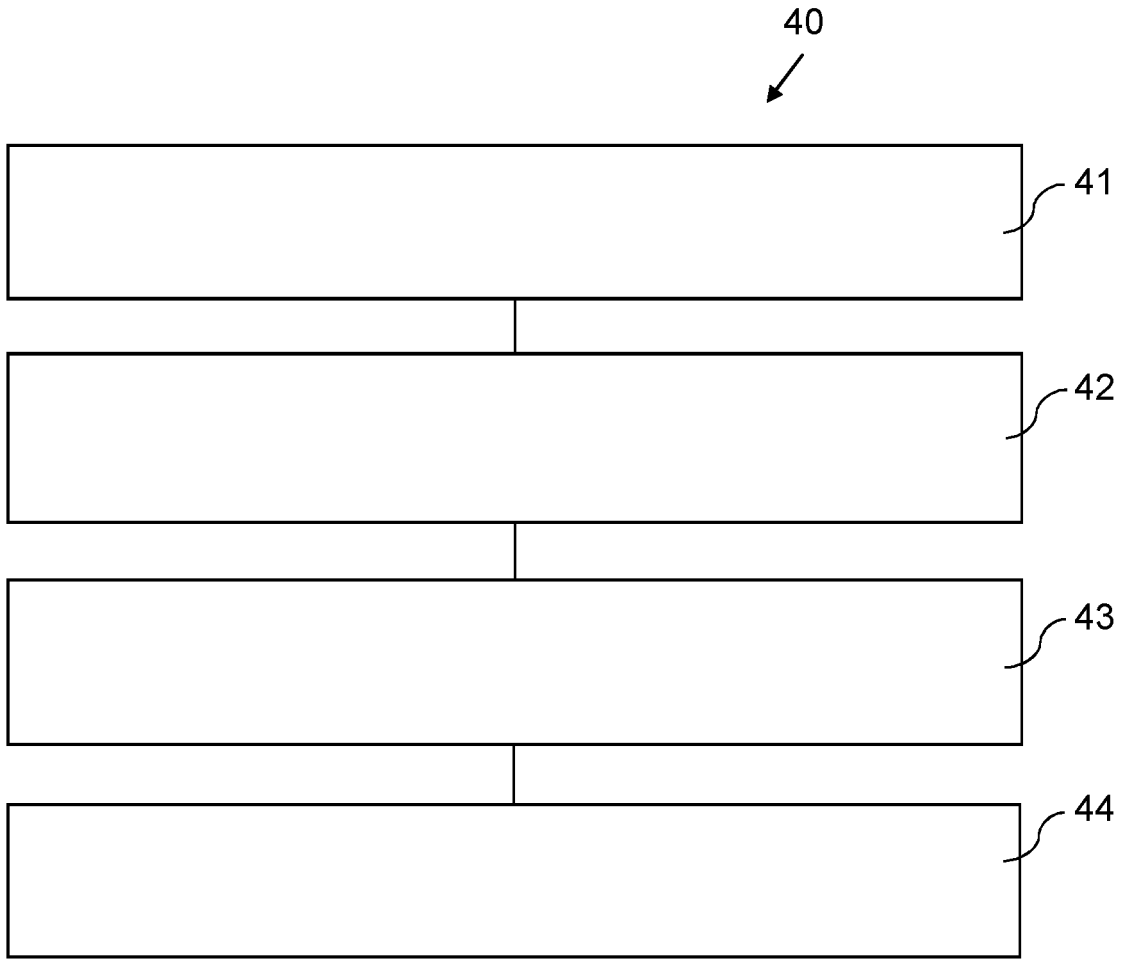
FIG. 4 schematically illustrates, in a flow chart type diagram, an embodiment of a method of transmitting a trigger message in a network of operatively interconnected node devices according to the present disclosure.

FIG. 4 schematically illustrates, in a flow chart type diagram, an embodiment of a method 40 of transmitting a trigger message in a network of operatively interconnected node devices according to the present disclosure.

The trigger message is configured for triggering a service to be provided by the node devices to a moving object. In the case of a light on demand service, the trigger message triggers a node device or a luminaire receiving the same to dim up to a certain level. In the meantime, the dimmed up luminaire may trigger other node devices in the network to dim up as well.

It can be contemplated by those skilled in the art that the service may be other services such as a geographic routing service or a network access service, which may require standalone or integrated modules connected to the node devices providing the corresponding service.

Figure 5:
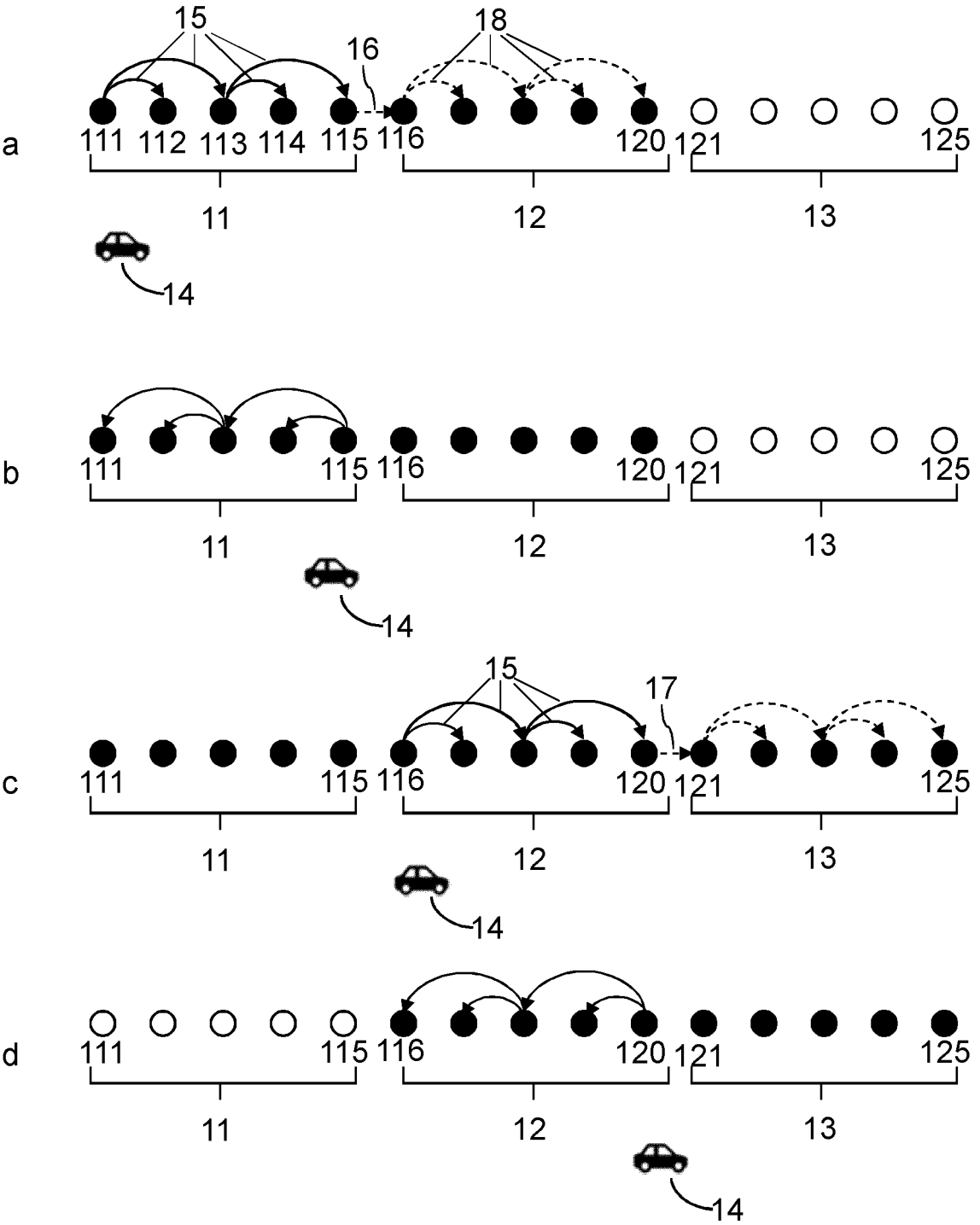
FIG. 5 schematically illustrates operations performed by the node devices of FIG. 1 as the moving object travels along the track.

The method 40 is described with further reference to FIG. 5, which schematically illustrates operations performed by the node devices 111 to 125 as the moving object 14 travels along the track having the node devices 111 to 125 arranged along it. For the sake of simplicity, in FIG. 5 only the edge node devices are indicated with numeral references.

When all node devices comprise sensors, it can be contemplated by those skilled the art that the operatively interconnected node devices are functionally the same, although operations performed by each node device vary from each other dependent on its position or location in the network, that is, whether the node device is a first edge node device, a second edge node device or a normal node device.

The operations performed by each node device further vary on the basis of whether the node device is located in a group already detecting the moving object by a sensor of one of its node devices, or in a group not yet detecting the moving object.

Alternatively, in the case that only the edge node devices and optionally a number of normal node devices comprises sensors, although not all node devices may detect a moving object, group level forward trigger of the service to be provided to the moving object can also be realised based on the method of the present disclosure.

In FIG. 5, curved arrows are broadcast forward trigger messages, with a solid line indicating that a moving object is detected and a dashed line indicating that an object is approaching but not detected yet. A straight dashed line with an arrow represent a unicast message sent from one edge node to its neighbouring or closest edge node, indicating that an object is approaching. Block circles are used to represent luminaires dimmed up, and blank circles are luminaries dimmed down.

Generally, referring to FIG. 5, actions or operations of an edge node or edge luminaire during a normal operation period may comprise the following:

On receiving a broadcast message from other luminaire of its own group indicating a motion is detected, which means that an object is approaching this edge node device, dimming up, with for example a relatively short hold-up time $T_{FD}$, and transmitting a unicast message to its neighbouring edge node indicating that an object is approaching. An example of such an edge node device is the luminaire 115 of the group 11 of FIG. 5a.

A hold-up time as used herein refers to a duration that a luminaire keeps dimming up after a motion of the detected moving object disappears.

On receiving a unicast message from its neighbouring edge node indicating an object is approaching, dimming up and transmitting a broadcast message to node devices within its group indicating a moving object is approaching. An example of such an edge node device is the luminaire 116 of the group 12 of FIG. 5a.

On receiving a broadcast message from an other luminaire of its own group indicating a motion is approaching, dimming up, with a relatively long hold-up time $T_{FA}$. An example of such an edge node device is the luminaire 120 of the group 12 of FIG. 5a.

When detecting a motion by a moving object, dimming up, with $T_D$ as a relatively long hold-up time hold-up time, and sending a broadcast message to node devices within its group indicating a motion is detected. An example of such an edge node device is the luminaire 111 of the group 11 of FIG. 5a.

The luminaires dim up for various periods of time depending on the trigger message, which also indicates a distance between a dimmed up luminaire and the approaching/detected moving object.

Specifically, $T_D$ is the hold-up time when the motion is detected by the luminaire itself. The value of $T_D$ is usually a few minutes. $T_{FD}$ is the hold-up time when receiving a forward trigger message from a nearby luminaire of its own group, indicating an object is approaching and might arrive soon. So $T_{FD}$ is usually much shorter than $T_D$, e.g., within 1 minute which is enough for the object to move from a location of the sender luminaire of the forward trigger message to a location of this luminaire. $T_{FA}$ is the hold-up time when receiving a forward trigger message from a nearby luminaire of its own group, indicating an object is approaching but still at the location of a neighbouring group.

So $T_{F4}$ is should be longer than $T_{FD}$ for the object to move to the location of this luminaire.

Moreover, actions or operations of a normal node device during a normal operation period may comprise: On receiving a broadcast messages from other luminaires of its group indicating either an object is detected or approaching, dimming up with a hold-up time of $T_{FD}$ or $T_{F4}$.

In the case that a normal node device also comprises a sensor, its operation may further comprise: When detecting an moving object, dimming up (with $T_D$ as hold-up time) and sending a broadcast message to node devices within its group indicating a moving object is detected.

Steps of FIG. 4 are now described in detail from the perspective of a first edge node device of a group, such as the luminaire 116 of group 12, which is triggered by a neighbouring group 11, herein referred to as an immediate preceding group which has a node device 111 that has detected the moving object 14, shown as a car in FIG. 5, using its sensor.

Referring to FIG. 4 and FIG. 5a simultaneously, at step 41, "receiving a first object-approaching trigger message transmitted by a second edge node device in an immediate preceding group", a first edge node device of a group, in the present example the luminaire 116 of group 12, receives a first object-approaching trigger message 16 from its neighbouring or closest edge node device, which in this example is the luminaire 115 referred to as a second edge node device in an immediate preceding group 11.

This is the so-called group level forward trigger, that is, a last node device of a group triggers a first node device of a next group along the moving direction of an object, by transmitting a trigger message indicating that the moving object is approaching.

Referring to the example as illustrated in FIG. 5a, luminaire 111, which is an edge node device of group 11, detects the car 14 using its sensor. The luminaire 111, upon detecting the car 14, transmits an object-detected message 15, which may be a broadcast message, to node devices within its group 11, as indicated by the curved arrows in FIG. 5a. The broadcast object-detected message 15 may be received by the luminaire 115 directly or by way of relay via another luminaire.

The luminaire 115 is triggered by the object-detected message 15 from luminaire 111 and dims up. As luminaire 115 has not detected the car 14 yet, it determines that the car is approaching soon. Therefore, it transmits the first object-approaching trigger message 16 to luminaire 116, which is the first node device in group 12, so as to forward trigger the node devices in group 12.

When one or more normal node devices in between edge nodes 111 and 115 also comprise sensors, these nodes will also detect the car 14 at a later time and transmit an object-detected trigger or motion detection message to node devices with the group 11. In this case, the edge node or luminaire 115 will, within a very short period (e.g., few seconds) receive at least two consecutive motion detection messages. The first message is sent from the other edge node of its own group, that is luminaire 111, the second, and optionally the third message, is sent from one normal node of its own group, for example luminaire 113. At this moment, say, moment T, the luminaire knows for sure that an object is approaching therefore it transmit the first object-approaching trigger message to its neighbouring edge node in the next group 12, that is, to luminaire 116, so as to forward trigger the next group 12.

A trigger message may comprise a type indicator indicating whether it is an object-detected trigger message or an object-approaching trigger message. An object-detected trigger message indicates that a motion or a moving object is detected, either by a node device transmitting the object-detected trigger message itself or by a further node device which has previously detected the moving object. As for an object-approaching trigger message, it indicates that the moving object is approaching but still at a position in a service range of a group other than a group comprising the node device receiving the object-approaching trigger message.

Based on the concept of group trigger of the present disclosure, the first object-approaching trigger message 16 transmitted from a second edge node device of an immediate preceding group to a first node device of a group is a message solely destined to the first node device of the group from the second edge node device of the immediate preceding group. An example of such a message is a unicast message, for example in a ZigBee network. This is to ensure that a group of node devices is triggered for a first time only by this unicast trigger message from the second edge node device of the immediate preceding group.

At step 42, "Transmitting a second object-approaching trigger message to other node devices in the same group", the first edge node device of the (present) group, which is the luminaire 116 of the group 12, transmits an object-approaching trigger message 18 to other node devices in the same group, to forward trigger the luminaires 117 to 120 of the group 12.

The second object-approaching trigger message 18 is a broadcast message transmitted to all other node devices in the same group as the first edge node device.

With reference to FIG. 5b, the car 14 now moves to the location of luminaire 115, which detects the motion using its sensor and then backward triggers luminaires 111 to 114 to dim up. Since all of luminaires 111 to 114 have already detected the car and are still within the hold-up time, the backward trigger message from the luminaire 115 will just reset the hold-up time for the luminaires 111 to 114.

It can be contemplated by those skilled in the art that backward trigger within a group of node devices may be prevented by way of further judgement steps or efforts. However, considering that only a few luminaires, in this example four, are triggered which only extend their hold-up time a little bit longer, impact on energy saving is quite negligible.

At step 43, "Detecting moving object", the first edge node device of the group now detects the moving object as the moving object has travelled to its location. This is also illustrated with reference to FIG. 5c, the car 14 now moves to the location of luminaire 116, which detects the motion of the car 14 using its sensor.

At step 44, "Transmitting an object-detected trigger message only to node devices in the group", the first edge node device of the group now forward triggers other node devices in its group. Step 44 when described with reference to FIG. 5c, is shown as the luminaire 116 forward triggers luminaires 117 to 120 to dim up.

It is noted that the luminaire 116 will not backward trigger the luminaires 111 to 115. This ensures that the group trigger is only performed in a forward direction and never happens backwardly, which is very beneficially for energy saving when the light on demand service is provided.

The object-detected trigger message used by the first edge node device to trigger the other node devices in its group, also triggers a second edge node device in the group to transmit a unicast first object-approaching trigger message to a first edge node device in an immediate subsequent group. The forward group trigger is therefore realised.

This is also illustrated in FIG. 5c. The luminaire 120, as the second edge node of the group 12, informs the luminaire 121 of group 13 that an object is approaching using the trigger message 17. Luminaire 121 then forward triggers luminaire 122 to 125 in its group to dim up.

It is seen from above that the first object-approaching trigger message 16 is sent to the second group 12, once a motion is detected by the first group 11. The first object-approaching trigger message may then be further relayed to a third group 13, or even fourth group, not shown in FIG. 5. In practice, the number of groups to be triggered may be specified so as to control the forward trigger in a better way.

This can be realized via for example one parameter in the first object-approaching trigger message, such as number_of_hop. As an example, when luminaire 120 of the second group 12 receives the broadcast object-approaching message, it checks whether the number_of_hop is bigger than 0. If so, it will send an unicast first object-approaching message to its neighbouring edge node 121 of the third group 12 with the number_of_hop decreased by 1. Once the number_of_hop is decreased to 0, the forward trigger will stop.

With reference to FIG. 5d, the car 14 now moves to the location of the luminaire 120, which may then backward trigger the luminaire 116 to 119. The scenario is similar to the luminaires 111 to 115 of the group 11 as illustrated in FIG. 5b and will not be elaborated here.

It can be understood that operations performed by the luminaires or node devices in the network vary depending on the location of the moving object in the network. As an example, the operations performed by the luminaire 115 of group 11 in FIG. 5a are performed by the luminaire 120 of group 12 in FIG. 5c, as the car 14 travels to the group 12.

It can be contemplated by those skilled in the art that the above method is also applicable for a network in which not all normal node devices comprise motion sensors. The principle of operation stays the same, only with less nodes detecting the moving object and triggers other nodes accordingly.

Figure 6:
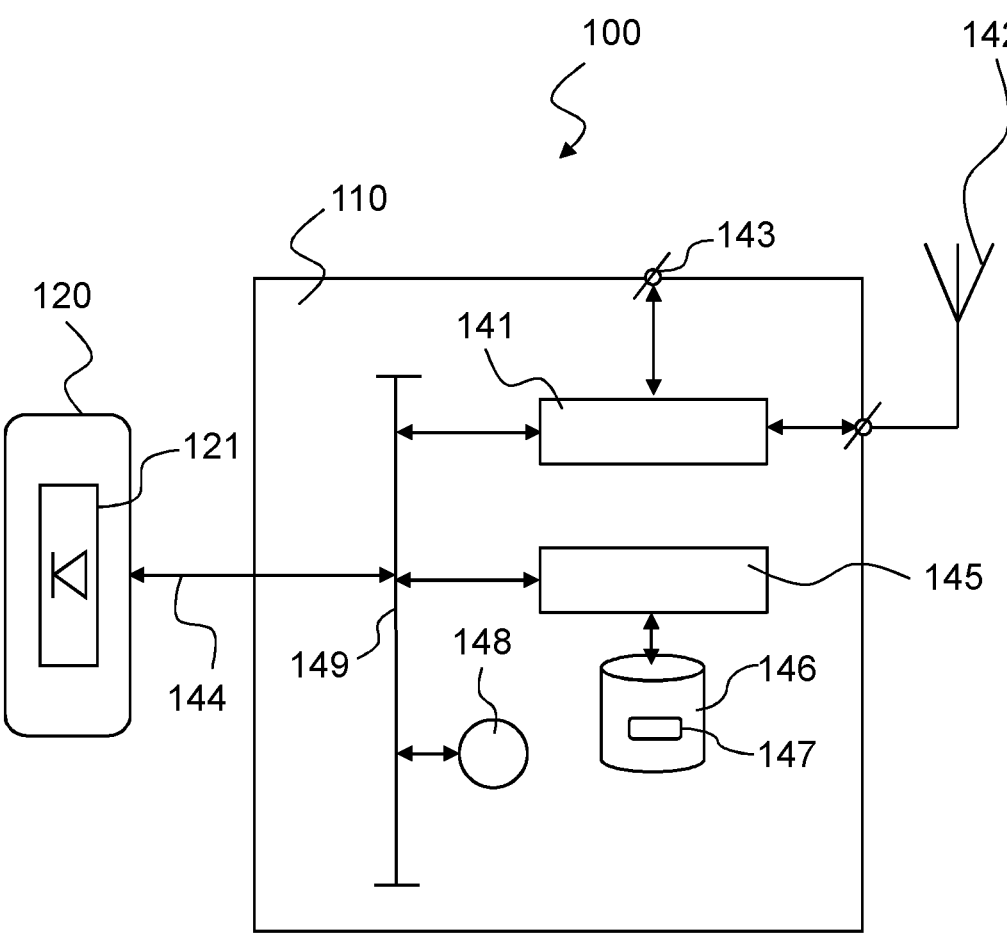
FIG. 6 illustrates, schematically, an embodiment of a node device arranged for operating in a network of operatively interconnected node devices, in accordance with the present disclosure.

FIG. 6 illustrates, schematically, a diagram of an embodiment of a node device or terminal device 100 arranged for operating in a network of operatively interconnected node devices, in accordance with the present disclosure.

The node device 100 comprises a control part or control device 110 and a load such as a lighting fixture or lighting device 120, comprising a lighting module 121, preferably a Light Emitting Diode, LED, lighting module or a plurality of LED lighting modules, operation of which may be controlled by the control device 110 from or through a remote control device, such as a remote or backend server (not shown), for example.

The control device 110 operates a short range communication interface 141, such as a network adapter or transceiver, Tx/Rx, module arranged for wireless 142 or wired 143 exchange of messages or data packets with another node device in the network. Network protocols for exchanging data by networked devices or nodes may comprise Zig-Bee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 110 further comprises at least one microprocessor, µP, or controller 145, and at least one data repository or storage or memory 146, among others for storing address information 147 of the node device itself and other node devices, such as identifiers, IDs, Media Access Control, MAC, addresses, of the node device 110, and subscriber information of node devices. The repository 146 may also store the event log or the neighbouring edge node table of the node device 110.

Optionally, the node device 100 may comprise a sensor or a plurality of sensors 148, dedicated to or suitable for detecting the presence of a target or an object such as a pedestrian or a vehicle moving past or in the neighbourhood of the node device 100. Such as a presence detection sensor including a passive infrared sensor, PIR, or a microwave motion sensor having a radar device, a sound detection sensor, a temperature measurement sensor, a camera operating in the visible and/or infrared spectrum, etc. that can detect a position or the presence of the object.

The sensor or sensors 148 may also be arranged for obtaining the moving direction and possibly the moving speed of the object, for example by relying on its own outputs, such as the successive outputs from successive radar measurements, for example.

The at least one microprocessor or controller 145 communicatively interacts with and controls the communication interface 141 and the at least one repository or storage 146 via an internal data communication and control bus 149 of the control device 110. The at least one microprocessor or controller 145 may operate one or a plurality of load control algorithms or applications, such as a light on demand application discussed above and/or other smart or optimized lighting service profiles, to perform the method of alerting node devices in the network described above.

The lighting fixture or lighting device 120 connects 144 to and is controlled from the data communication and control bus 149 by the at least one microprocessor or controller 110.

Those skilled in the art will appreciate that any electric load may be connected 144 to the control bus 149 other than or in addition to a lighting fixture or lighting device 120, such as an access point device or a geographic routing device.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of triggering a service provided by a network of operatively interconnected node devices arranged along at least one elongated geographic track to an object moving along said geographic track, said node devices divided into a plurality of groups, each of said plurality of groups comprising a first edge node device, at least one normal node device, and a second edge node device, within each of said plurality of groups at least said first edge node device, said at least one normal node device, and said second edge node device each respectively comprising a sensor for detecting said object, said method comprising:

generating, by a node device within a group of said plurality of groups, an event log comprising a plurality of items for node devices in said group including said node device, each item comprising a unique identifier of a respective node device in said group with a sensor and a time of detecting said object by a sensor of said respective node device;

identifying, by said node device within said group, itself as an edge node device when an item comprising its unique identifier comprises an earliest or latest time of detecting said object by a sensor of said node device;

receiving, by a second edge node device in said group, an object-detected message from a first edge node device or a normal node device in said group; and determining, by said second edge node device in said group, that said object has been detected by a sensor of said second edge node device, wherein said object-detected message is configured to trigger a service provided by said node devices to said object.

2. The method according to claim 1, wherein each item of said event log further comprises a speed of said object.

3. The method according to claim 1, further comprising identifying, by a particular edge node device in a group, an edge node device as its closest edge node device in a neighbouring group by way of the following steps:

receiving, by said particular edge node device, a number of one hop broadcast messages transmitted by edge node devices in neighbouring groups;

creating, by said particular edge node device, a neighbouring edge node table comprising a plurality of items, each item comprising a unique identifier of an edge node device transmitting a one hop broadcast message, a group identifier of said edge node device, and a signal strength indicator of said one hop broadcast message; and identifying, by said particular edge node device, an edge node device in a neighbouring group as said closest edge node device in said neighbouring group based on received one hop broadcast messages and/or signal strength of said received hop broadcast messages.

4. The method according to claim 3, further comprising:

transmitting, by said particular edge node device, a unicast message to said edge node device identified as its closest edge node device in an immediate preceding group; and receiving, by said particular edge node device, a response unicast message as a confirmation from said edge node device identified as its closest edge node device in said immediate preceding group.

5. The method according to claim 1, wherein said node devices comprise at least one of smart pole devices and lighting devices providing at least one of a lighting service, a network access service and a geographic routing service to said object.

6. The method according to claim 1, wherein said second edge node device comprises at least one of smart pole devices and lighting devices.

7. A network system comprising said operatively interconnected node devices arranged along at least one elongated geographic track, wherein the network system is configured to provide a service to an object according to claim 1.

8. A non-transitory computer program product, comprising a computer readable storage medium storing instructions which, when executed on at least one processor, cause said at least one processor to carry out the method according to claim 1.

9. A method of triggering a service provided by a network of operatively interconnected node devices arranged along at least one elongated geographic track to an object moving along said geographic track, said node devices divided into a plurality of groups, each of said plurality of groups comprising a first edge node device, at least one normal node device, and a second edge node device, within each of said plurality of groups at least said first edge node device and said second edge node device each respectively comprising a sensor for detecting said object, said method comprising:

receiving, by a second edge node device in a group of said plurality of groups, an object-detected message from a first edge node device or a normal node device in said group;

determining, by said second edge node device in said group, that said object has not been detected by a sensor of said second edge node device;

sending, by said second edge node device, a first object-approaching message to a first edge node device in an immediate subsequent group;

wherein said object-detected message and said first object-approaching message are configured to trigger a service provided by said node devices to said object.

10. The method according to claim 9, wherein said first object-approaching message is a unicast message, said object-detected message is a broadcast message.

11. The method according to claim 9, further comprising:

transmitting, by said first edge node device in said immediate subsequent group, a second object-approaching message to other node devices in said immediate subsequent group in response to receiving said first object-approaching message.

12. The method according to claim 11, further comprising:

transmitting, by a second edge node in said immediate subsequent group, another first object approaching message to a first edge node in a next immediate subsequent group in response to receiving said second object-approaching message.

13. The method according to claim 11, wherein said first and second object-approaching messages and said object-detected message are configured to trigger said service for a determined period of time, said determined period of time of said service triggered by said first and second object-approaching messages is longer than said determined period of time of said service triggered by said object-detected message.

14. The method according to claim 9, further comprising:

transmitting, by said first edge node device in said immediate subsequent group, an object-detected message only to node devices in said immediate subsequent group, in response to detecting said object by a sensor of said first edge node device in said immediate subsequent group, said object-detected message configured for triggering a second edge node device in said immediate subsequent group to transmit a further first object-approaching trigger message to a first edge node device in a next immediate subsequent group.

15. The method according to claim 9, wherein said first object-approaching message comprises an indicator indicating a number of groups to be sequentially triggered by relaying said first object-approaching trigger message from said second edge node device in said first group to a first edge node device in said immediate subsequent group.

16. The method according to claim 9, wherein said node devices comprise at least one of smart pole devices and lighting devices providing at least one of a lighting service, a network access service and a geographic routing service to said object.

17. The method according to claim 9, wherein said second edge node device comprises at least one of smart pole devices and lighting devices.

18. A network system comprising said operatively interconnected node devices arranged along at least one elongated geographic track, wherein the network system is configured to provide a service to an object according to claim 9.

19. A non-transitory computer program product, comprising a computer readable storage medium storing instructions which, when executed on at least one processor, cause said at least one processor to carry out the method according to claim 9.

* * * * *